Oct. 13, 1931.   J. A. F. BRUN   1,827,139
TAXIMETER
Filed Sept. 11, 1922   11 Sheets-Sheet 2

Oct. 13, 1931.  J. A. F. BRUN  1,827,139

TAXIMETER

Filed Sept. 11, 1922    11 Sheets-Sheet 3

FREE   Tariff 3   Tariff 2   Tariff 1   FREE

Inventor
Jean Albert François Brun
By Edward C. Sassett
Attorney

Oct. 13, 1931.  J. A. F. BRUN  1,827,139
TAXIMETER
Filed Sept. 11, 1922   11 Sheets-Sheet 4
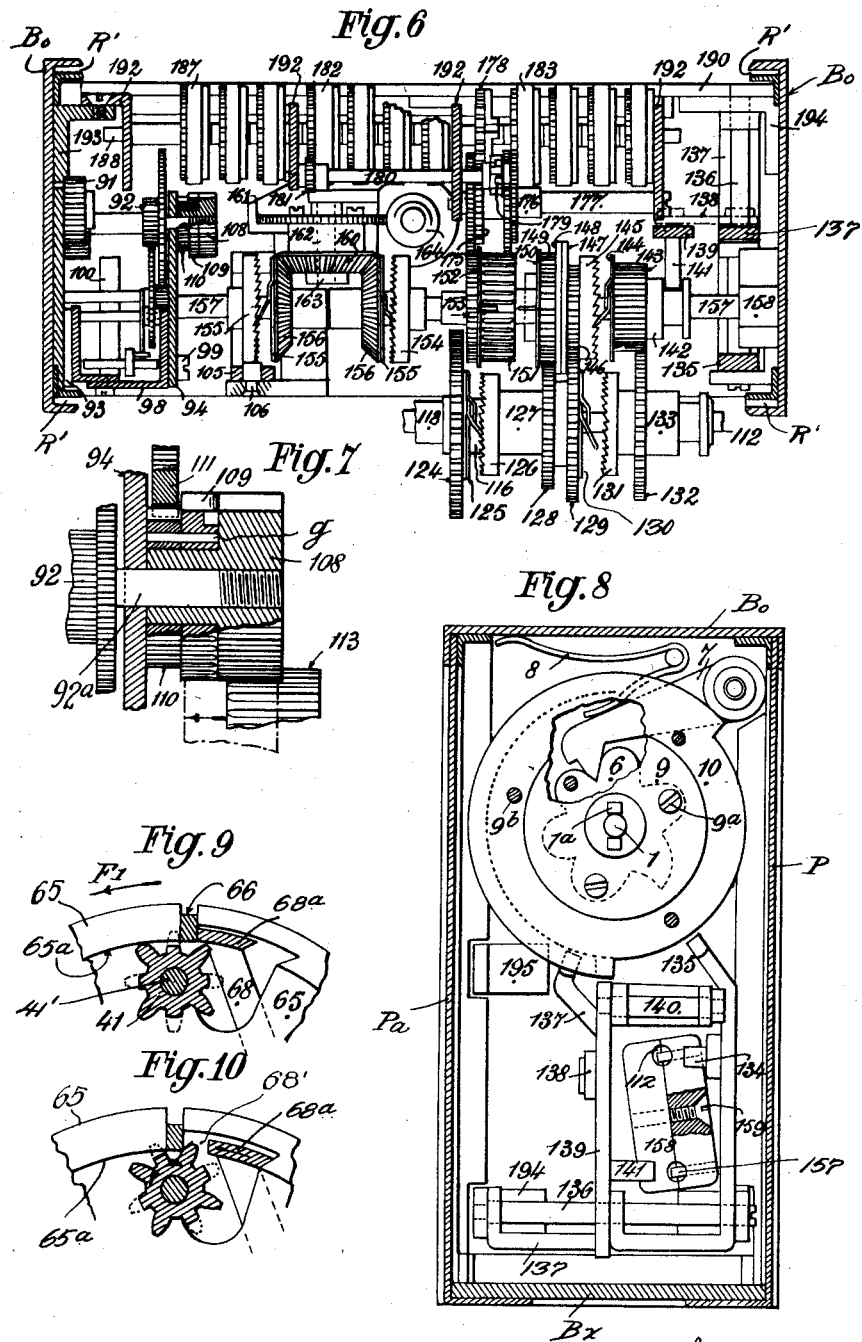

Oct. 13, 1931.   J. A. F. BRUN   1,827,139
TAXIMETER
Filed Sept. 11, 1922   11 Sheets-Sheet 5
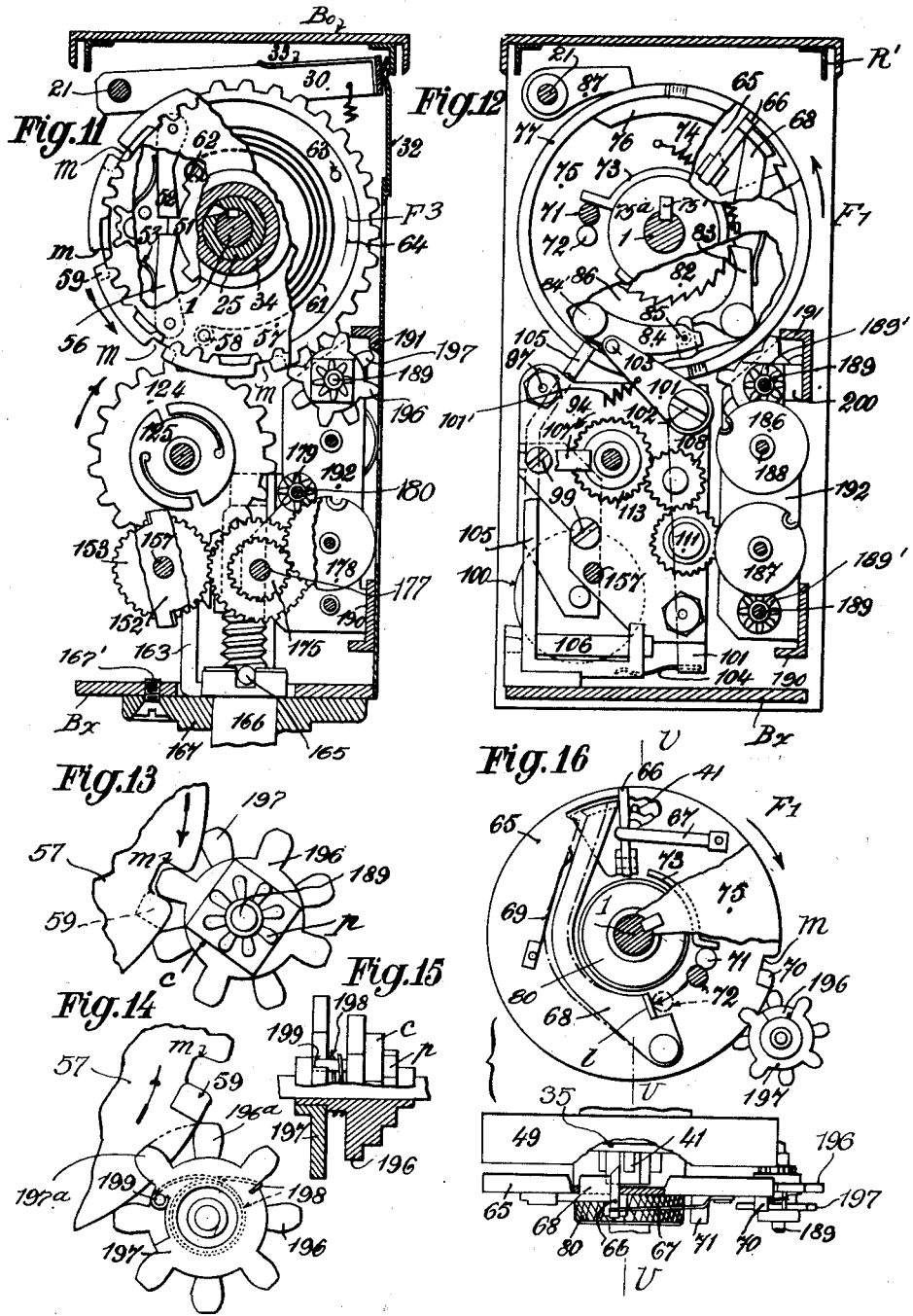

Oct. 13, 1931.  J. A. F. BRUN  1,827,139
TAXIMETER
Filed Sept. 11, 1922   11 Sheets-Sheet 6
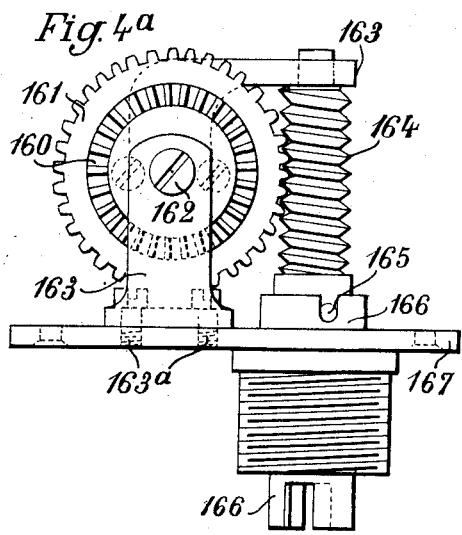
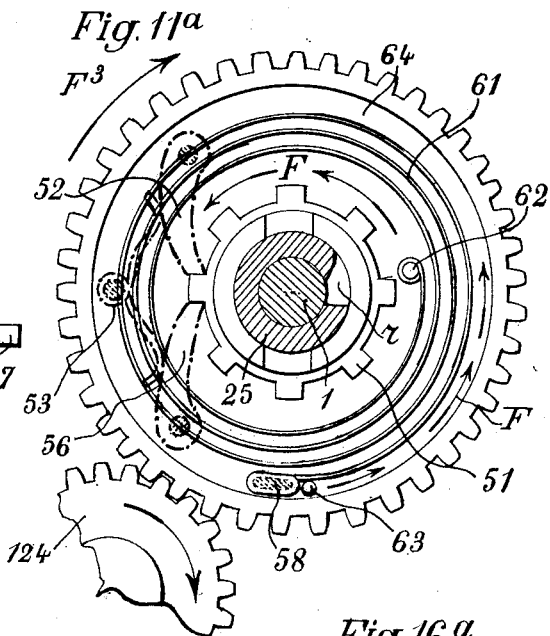
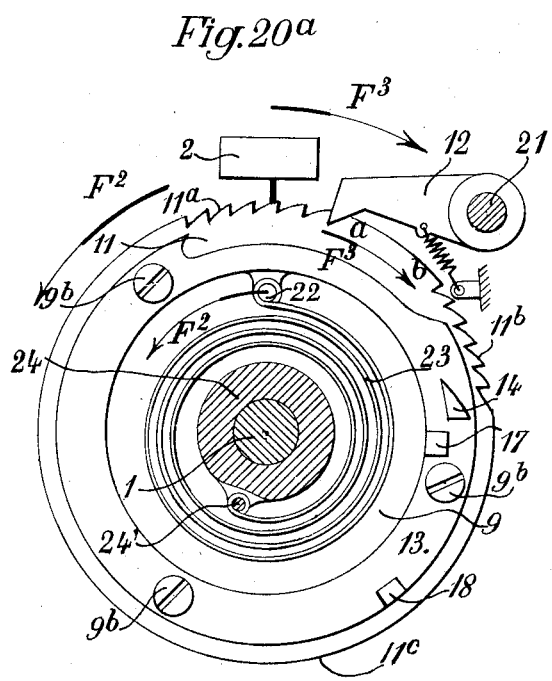
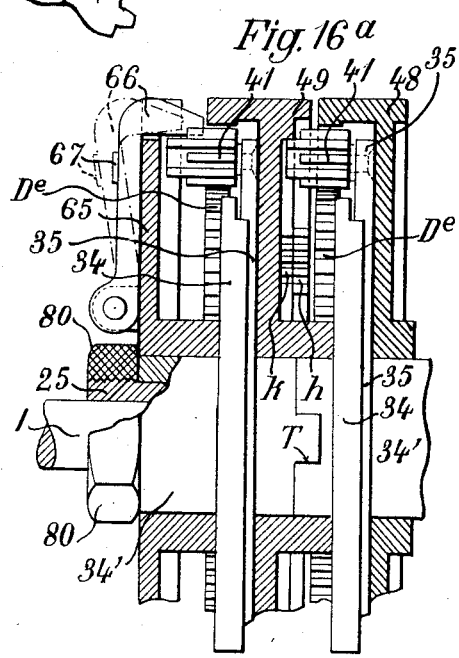

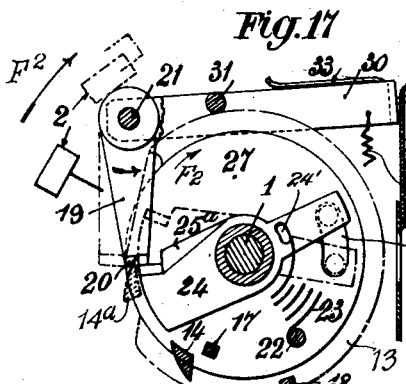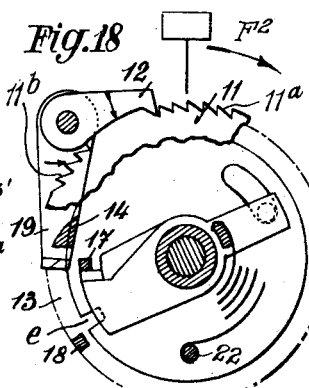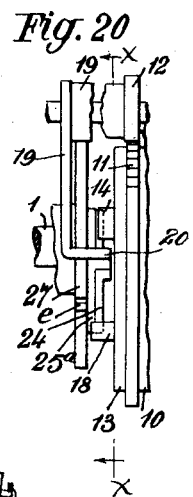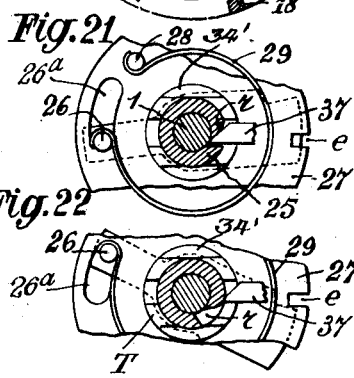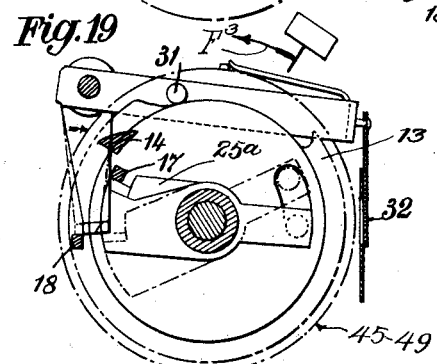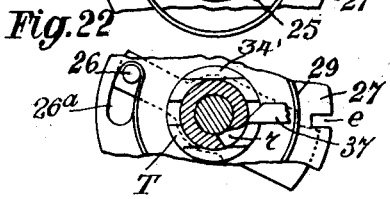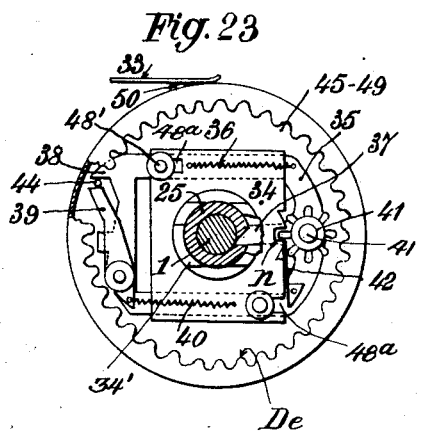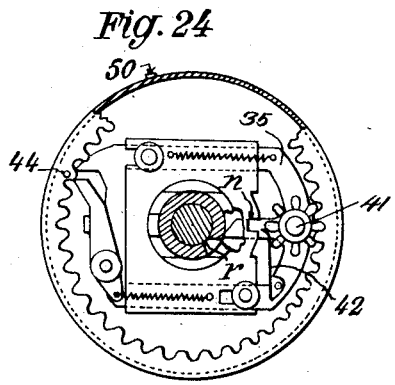

Oct. 13, 1931.   J. A. F. BRUN   1,827,139
TAXIMETER
Filed Sept. 11, 1922   11 Sheets-Sheet 8
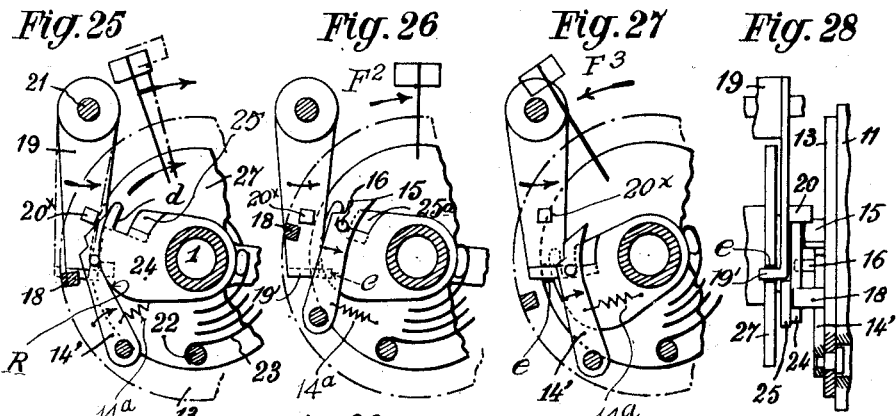
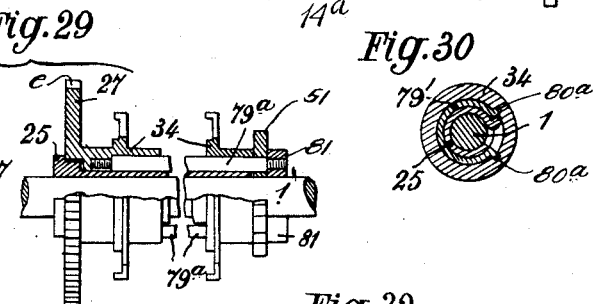
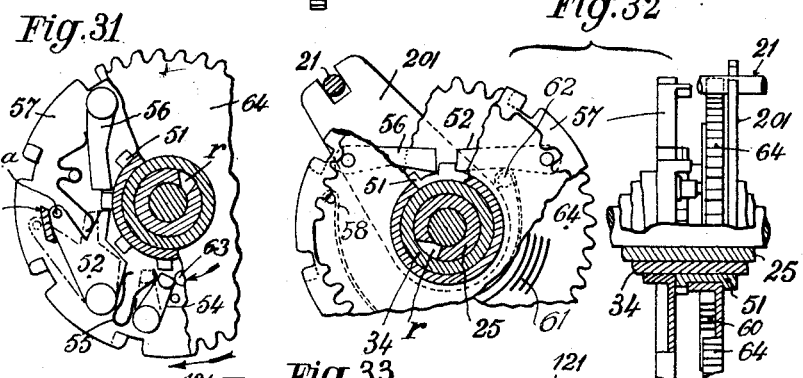
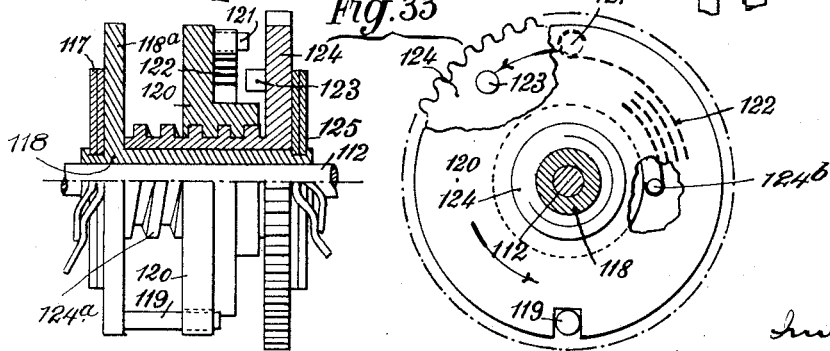

Oct. 13, 1931.　　　J. A. F. BRUN　　　1,827,139
TAXIMETER
Filed Sept. 11, 1922　　11 Sheets-Sheet 9
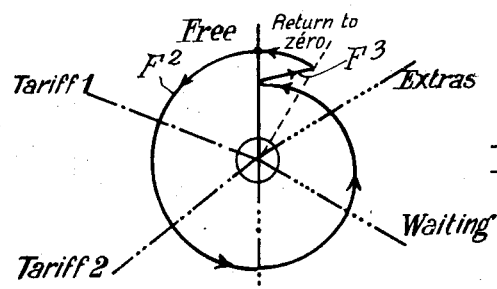
Fig. 34
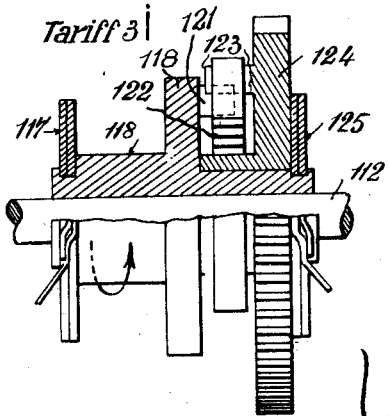
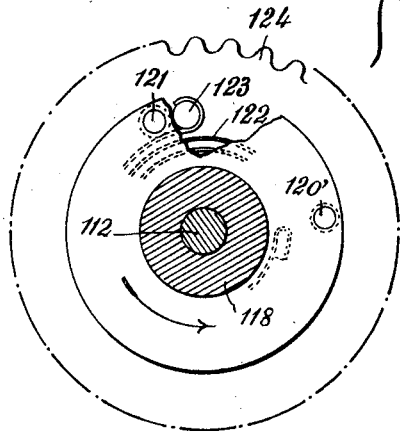
Fig. 35
Inventor
Jean Albert François Brun
By Edward C. Sarnett
Attorney.

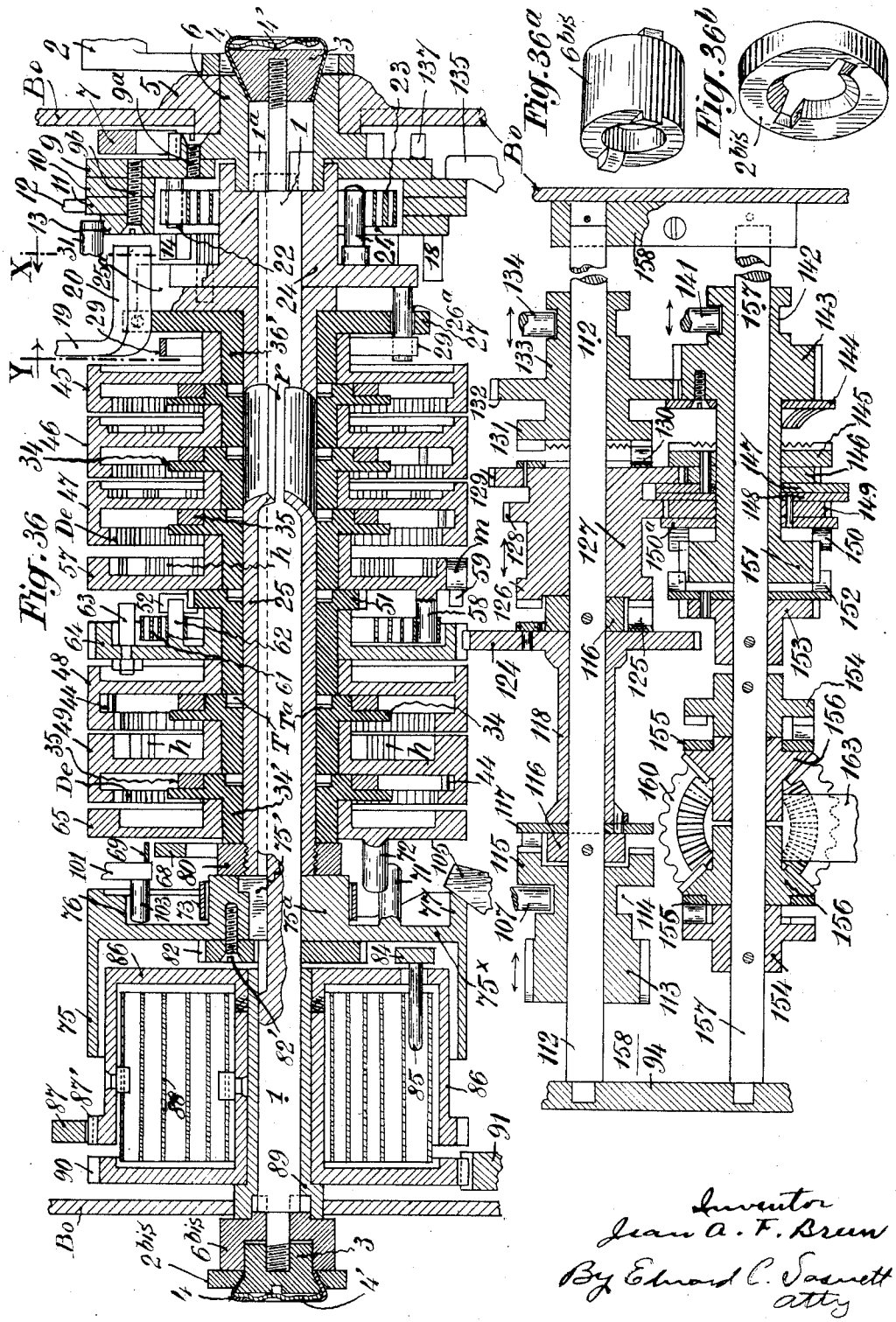

Oct. 13, 1931. J. A. F. BRUN 1,827,139
TAXIMETER
Filed Sept. 11, 1922 11 Sheets-Sheet 11
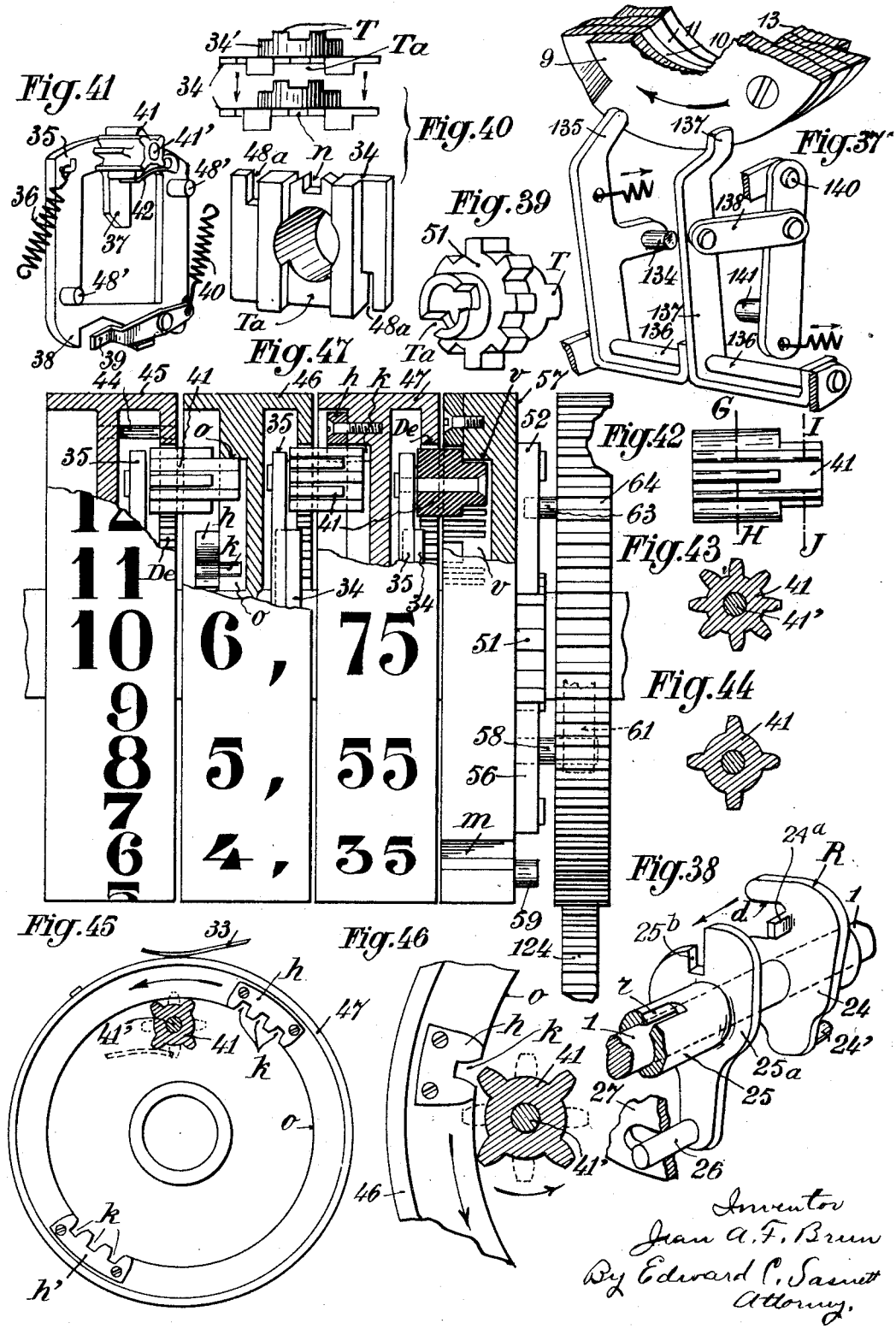

Patented Oct. 13, 1931

1,827,139

UNITED STATES PATENT OFFICE

JEAN ALBERT FRANÇOIS BRUN, OF PARIS, FRANCE

TAXIMETER

Application filed September 11, 1922, Serial No. 587,819, and in France September 19, 1921.

This invention relates to a taximeter of the type comprising a mixed time and distance drive under several tariffs and provided with fare, distance and extras totalizers as well as a register for the total time of payment.

According to the present invention, the trip fare and extras numeral wheels, the zeroizing mechanism, the spring barrel of the clock-work mechanism, and the operating cams of the taximeter are mounted co-axially with the main shaft actuated by means of the flag, and the winding of the clock-work, registration of extras and zeroizing of the trip numeral wheels are effected by the flag.

The mechanism for effecting these different operations constitutes a cylindrical arrangement comprising the numeral drums, and a rigid shaft, carrying the flag, extends through the arrangement in a direction coincident with its axis.

As the drums indicating the charge and "extras" and also these connected with the different total registering drums are always held securely in their positions and as, in the said taximeter, the registering apparatus comprises no movement by means of a pawl and detent, it is impossible for the conductor to tamper with the mechanism and, consequently, the hirer and the owner have the best guarantee that the operations are truly registered.

The mounting of the members is very easy and very rapid, owing to the absence of any intermediate plate and to the combination of sets of independently operating mechanism which, having only a few points of contact together, do not require any accurate adjustment in assembling.

The space occupied by the taximeter is considerably reduced in comparison with known apparatus.

The accompanying drawings represent examples of constructions according to the invention.

Figure 4:
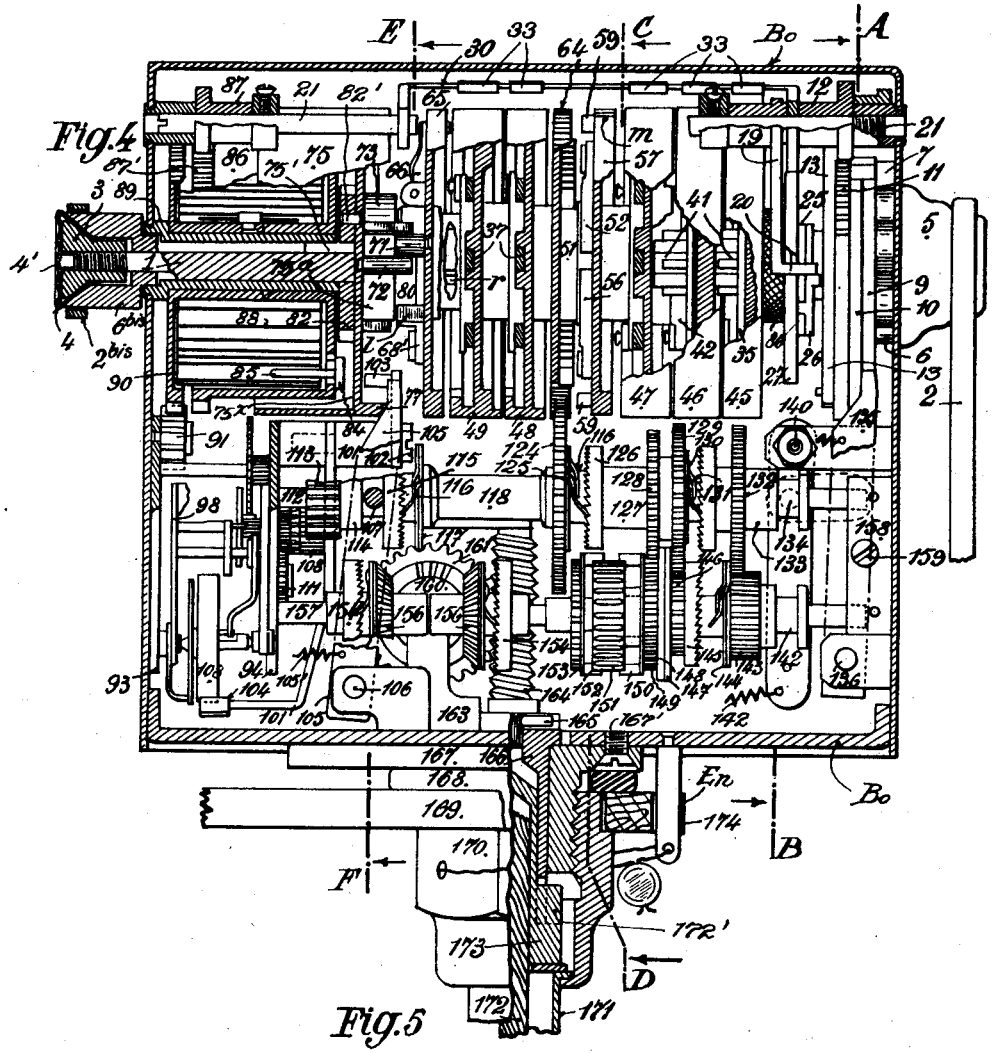
Fig. 4 is a rear view corresponding to Fig. 2.

Fig. 4ª is a detail view of a gearing by means of which motion is transmitted to the drums indicating the fare.

Figure 5:
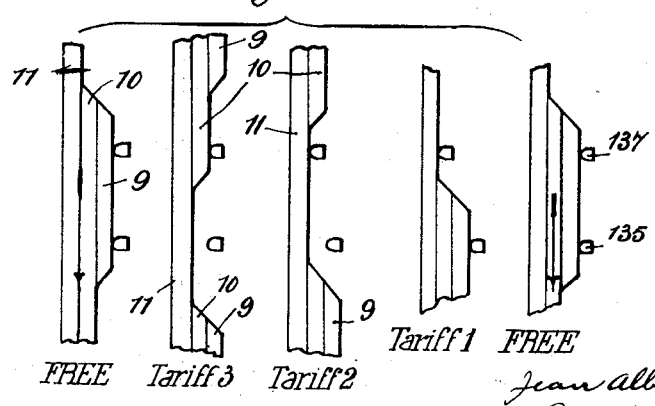

Fig. 5 is a diagram showing the different positions of the cams controlling the tariffs and of the lever actuating the sliding sleeves of the change-speed mechanism.

Fig. 6 shows the apparatus in plan one of the axes being for clearness supposed turned backward.

Fig. 7 is a view on a larger scale, partly in section, of the arrangement of pinions actuating the integrating device during the payment.

Figure 2:
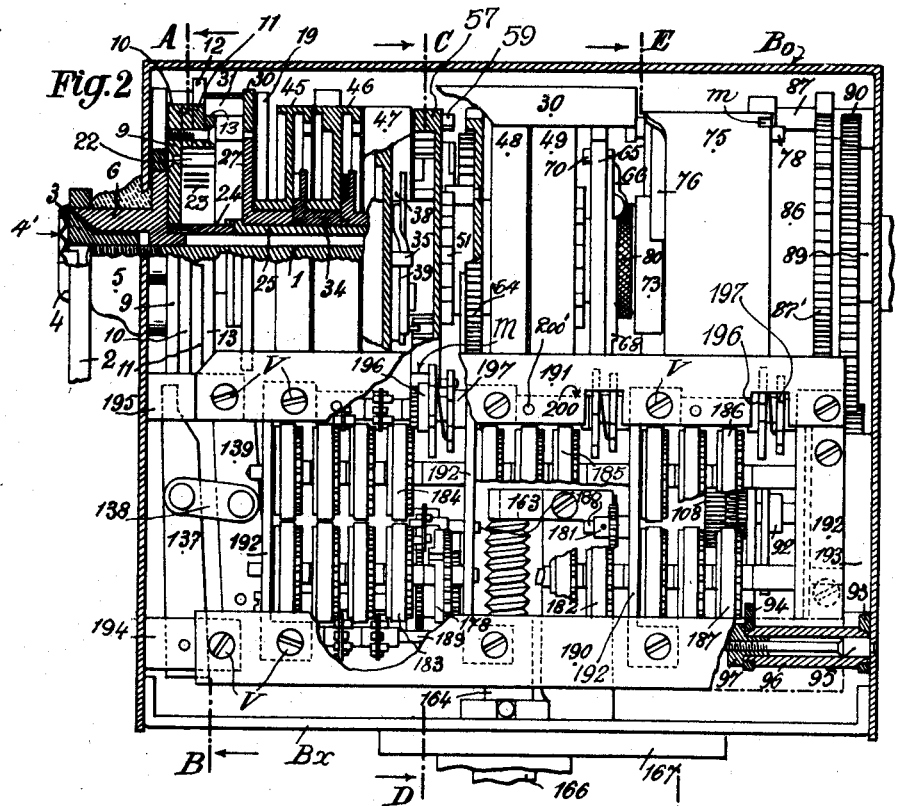
Fig. 2 is a front view of the interior of the apparatus, the window plate and screen being removed, some parts being shown in section and others in elevation with parts removed, in order to allow other parts to be seen.

Fig. 8 is a section on the line A—B of Figs. 2 and 4 showing the arrangement of cams and levers controlling the tariffs and holding the flag in its different positions.

Figs. 9 and 10 are diagrammatic views showing the action of the mechanism controlling the "extras".

Fig. 11 is a section on the line C—D of Figs. 2 and 4 showing the mechanism actuating the fare numeral drums and the control of the device for integrating the total miles.

Fig. 11ª is a sectional view of a gearing by means of which motion is transmitted to the fare numeral drums.

Fig. 12 is a section on the line E—F of Figs. 2 and 4 showing the mechanism for winding up the spring barrel of the clockwork mechanism, the means for registering the extras, the arrangement of the clockwork movement, the time stopping and disengaging device and finally the mechanism of control of the devices for integrating the number of engagements and the time of payment.

Figs. 13, 14 and 15 represent the mechanism actuating the upper integrating devices.

Fig. 16 represents in elevation and in plan the mechanism for controlling the extras.

Fig. 16ª is a section on the line U—U of Fig. 16.

Figs. 17, 18, 19 and 20 represent the mechanism for returning to zero.

Fig. 20ª is a section on the line X—X of Fig. 20 looking in the opposite direction of the arrows.

Figs. 21 and 22 represent the relative positions of some members in the positions of engagement and disengagement.

Fig. 23 shows the interior mechanism of the drums in the position of their return to zero (position of disengagement).

Fig. 24 shows the same mechanism in the position of its normal operation (position of engagement).

Figs. 25, 26, 27 and 28 represent in different positions a modified construction of the mechanism for returning to zero.

Fig. 29 represents on face and on side a modification of the members carrying the drums and the sliding element and also of the grooved cylindrical casing.

Fig. 30 shows another method of mounting these members.

Fig. 31 shows a modification of the releasing arrangement of the rotary movement of the drum indicating the cents for the fare to be paid.

Fig. 32 shows end elevation and a side view of a modification of this mechanism.

Fig. 33 shows in the same manner a device called lost time movement and intended to increase the duration of the time of engagement.

Fig. 34 is a diagram showing the manipulation of the flag in the case in which the arrangement of Figs. 25–28 for returning to zero is used.

Fig. 35 shows an elevation and a side view of another lost time arrangement for the taking into engagement.

Fig. 36 shows diagrammatically at a greater scale a longitudinal section of the whole of members surrounding the shaft of the flag and the change-speed mechanism. On this explicative figure of the mounting of the members, the position of the levers, of the pawls and the packing up of the cams are shown with the best manner for facilitating the description of the apparatus.

Fig. 36ª shows a socket intended to be located at one of the ends of the main shaft carrying the flag and which is integral with this shaft by tenons engaged in the grooves of said shaft.

Fig. 36ᵇ shows a ring intended to be fixed at the outer end of one of the sockets located at the ends of the shaft carrying the flag.

Fig. 37 shows in perspective the whole of the levers actuating the sliding sleeves of the change-speed mechanism.

Fig. 38 shows how the tube 25 and its radial projection 25ª are integral in rotation with the member 24. This device is corresponding to the mechanism shown in the Figs. 25 to 28.

Figs. 39 to 42 are detail views of some members.

Fig. 43 is a section on the line G—H of Fig. 42.

Fig. 44 is a section on the line I—J of Fig. 42.

Figs. 45, 46, 47 are diagrammatic views of explication of the movement of the fare numeral drums.

In these different figures, the springs are sometimes replaced by arrows indicating their direction of action.

Casing

On the contrary to the arrangements habitually used in the construction of taximeters, the box of the hereinafter described apparatus is constituted by a sheet-iron plate Bo having the shape of an inverted U riveted on a base Bx. The box acts as a frame for the mounting of the different mechanisms supported by rings or squares riveted on the sides of the U or on the base of the box. The closing of the box is obtained with two panels sliding into grooves R' provided in the U (Fig. 6).

The panel located on the side where the indications of the drums are to be read is provided with a plate-glass covering a plate pierced with windows through which appear the different indications of the tariff used: the fare of the travel, the extras and the different integrating charges.

Mounting of the flag

The taximeter is provided with sets of easily detachable mechanisms having between them only a few points of contact, the determination of which does not necessitate any adjustment.

The shaft 1 (Figs. 2, 4 and 36) extends through all the apparatus and engages by tenons and mortises 1ª a cam 6 rotating in the ring 5 riveted on one of the sides of the box Bo. The other end of the shaft 1 rotates in a tube 89 also riveted on the box Bo. The cam 6 is provided with notches or recesses in which the end of a lever 7 engages, which lever is under the action of a powerful spring 8 (Fig. 8) and swings on a spindle 21 (Fig. 4) carried by the casing Bo. The object of this arrangement is to determine accurately the different position which the flag can take up.

The flag 2 is secured by tenons and mortises on the cam 6 and a nut 3, screwed on the shaft 1, makes the members 1, 6 and 2 integral each other. The flag may, under the same conditions, be secured on the other end of the shaft 1 for replacing ring 2$^{bis}$ engaged by tenons and mortises with the member 6$^{bis}$ (Fig. 36). A safety lead 4', maintained by a cover 4, avoids the dishonest dismounting of the members by the chauffeur.

Figure 3:
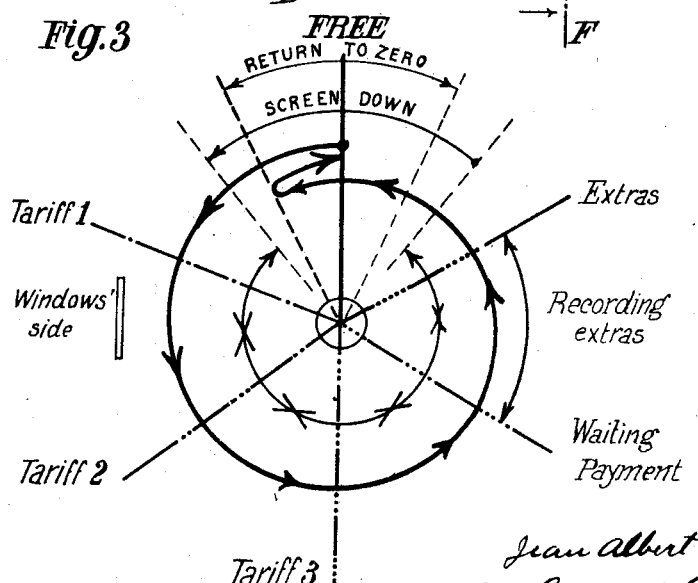
Fig. 3 is a diagram showing the different positions which the flag can occupy and also the direction in which the flag is manipulated.

This flag enables to be successively in the positions "Tariff 1", "Tariff 2", "Tariff 3", "Payment", "Extras" or "For hire" (Fig. 3).

Tariff cams

Referring to Fig. 36, the cam 6, as shown, is secured on a disc 9 (by means of a screw 9$^a$) and on this disc are secured (by means of screws 9$^b$) rings 10, 11 and 13. The rings 9 and 10 are formed as cams near their periphery for actuating the levers 135 and 137 controlling the engagement of the miles motion and of the adjustment of the taximeter to one of the three tariffs.

The ratchet wheel 11 is provided with teeth only along a portion of its periphery (Fig. 20$^a$) and is adapted to prevent, by means of a pawl 12 oscillating on the spindle 21, the flag from being moved backwards at the moment on which the return to zero is being commenced and to oblige the chauffeur to finish this operation before being able to press down again the flag. The cam 13 controls the movement of a screen 32 by a pin 31 fixed on an arm 30 pivoted on the spindle 21. The screen 32 falls down and hides the fare when the flag is turned for beginning the return to zero and is only raised when the taximeter is at the "Tariff 1".

The whole of these members constitutes a drum at the interior of which is located a spring 23 fixed, on one hand, on 22 on the disc 9 and, on the other hand, on 24' on a sleeve 24 loosely mounted on the shaft 1; this spring ensures the return to zero of the numeral drums.

Drums block

The sleeve 24 is constantly pressed by the spring 23 against a curved portion of a radial part 25$^a$ of a tubular member 25 surrounding the shaft 1 on a great part of its length and able to rotate on it. On the member 25 are loosely mounted (Figs. 4 and 36) from the right to the left, a disc 27 provided with a tubular part or hub 36', three identical members provided with a part 34 and a tubular part 34' (Fig. 40), a toothing star member 51 (Fig. 39) and further members 34—34'. All these members are connected the one to the other by fitting by tenons T and mortises T$^a$ so that the last member 34—34' on the left hand is integral with the disc 27—27' located on the right hand (see Fig. 36).

All these members are in engagement by means of a nut 80 screwed on the end of the tube 25.

The member 25 is able to receive a certain movement of rotation relatively to the disc 27, which movement is limited by a slot 26$^a$ provided in the disc 27, in which slot a pin 26 on the sleeve 25$^a$, 24 is engaged.

A strong spring 29, fastened, on the one hand, to the pin 26 on the part 25$^a$, 24 and, on the other hand, to a pin 28 on the disc 27, tends to bring the parts 24, 25 and 25$^a$ into the position shown in Fig. 21 (disengagement).

A lever 19 pivoted on the spindle 21 under the action of a spring shown by an arrow (Figs. 17 to 19) rests constantly by its bent part 20 against the disc 27 and can enter, more or less deeply and by its part 20, a notch of this disc.

The plates 34 serve as guides to sliding members 35 (Figs. 4, 23 and 24 and 36) maintained by pins 48' fixed on 35 and sliding into recesses 48$^a$ of 34, the hub 34' of 34 serving as supports to the numeral drums 45 to 49 which turn loosely on the hubs 34' of plates 34. They are, from the right to the left (Figs. 4 and 36), a ten dollars drum 45, a dollars drum 46, a cents drum 47 (these three drums for indicating the fare of the charge), a disc 57, a toothed wheel 64 loosely mounted on the hub 51$^a$ of the toothing starry member 51, a ten dollars drum 48 for extras, a cents drum 49 for extras and finally a disc 65.

The sliding members 35 receive a transverse or radial displacement relatively to the shaft 1, each of them having a projection 37 which can engage in a longitudinal groove r of the member 25 and drive the said sliding member 35. Each slide 35 carries also a small pinion 41 having alternately long and short teeth. This pinion comes into contact, at the engaged position, only by its long teeth with a smooth circular part of the corresponding drums 45 to 49 engaging by its long and short teeth with the continuous internal gearing De (Figs. 23, 24 and 47) of the next drum. A transfer sector h, integral with the preceding drum and having two or four teeth adapted to engage with the long and short teeth of the pinion 41, actuate periodically the pinion which in rotating rotates the next succeeding drum, the said rotation corresponding to the number of teeth of the toothed sector h of the preceding drum. This transmission device, which is in itself known, allows the drums 45—49 to be driven in succession in the same direction. In the other direction, the movements of the drums 45—49 are imparted by the sliding members 35 when carried on by the zeroizing device, as will be explained hereinafter, pins 44 of the drums being engaged by projection 38 and pawls 39 of the sliding members 35.

The pawl 39 carried by the sliding member 35 is under the action of a spring 40 and a spring 36 tends always to bring the member 35 into the position of disengagement (Fig. 23), that is to say into the position in which the pinion 41 does not engage with the internal teeth of the drums 45—49 and in which the projection 37 is in the groove r of the sleeve 25.

At each of these positions, the pinion 41 is maintained in the correct position by a spring 42 and a recess n on the plates 34, so that there is always a short tooth of 41 which occupies the diametral position determined by a line connecting the shaft 1 and the spindle of the pinion 41 (Figs. 23–24–40 and 41).

All these drums 45 to 49 or discs 57, 64, 65 carry different devices or members, the mounting, the function and the working of which will be hereinafter described.

Tariff drums

On the projecting part of the shaft 1, out of the tube 25, is located a drum 75 on the periphery of which are the indications given through the tariff window and stating the position of working occupied by the taximeter.

This drum 75 (Figs. 12 and 36) comprises a web 75x connecting its outer part with a hub 75a. The drum 75 is in egral in rotation with the shaft 1 by means of a key 75'. The drum is provided with a circular edge formed as a cam at 77 acting on a lever 105, pivoted in 106 (Fig. 12) and engaging and disengaging the time movement. By the cam surface 76 dressed on the circular inner part of the drum 75, the latter acts on a pin 103 of a lever 101 which, pivoting about a spindle 102 mounted on a plate 94 (Fig. 12), applies a spring 104 to the balance wheel 100 of the time movement which is of an usual known system. In this way, it stops the balance wheel 100 and restores it when the lever 101, returned by means of a spring 101' (Fig. 12), leaves the balance wheel.

Winding up of the clock work spring

On the drum 75 (Fig. 12) is secured at 82' a ratchet wheel 82 which is in contact with a pawl 83 secured on the barrel 86 loosely mounted on the tube 89. When the flag 2 is manipulated in the normal direction of rotation, the barrel spring 88 is wound up.

For preventing the spring 88 from being overwound, the barrel 86 carries a member 84 pivoted at 84' on 86 and comprising a pin 85 traversing an aperture of the vertical wall of the barrel 86. This pin 85 engages between the two last spires of the spring 88 so that when, in consequence of the winding up, the convolutions approach the shaft 1, the member 84 oscillates about its pivot 84' and rests on the tail of the pawl 83, thus liberating the ratchet wheel 82.

The drum 75 with the ratchet wheel 82 and the shaft 1 may then rotate without carrying away the barrel 86.

The movement of the spring 88 is transmitted by means of a large pinion 90 (Figs. 2, 4, 6, 36) and by means of a number of intermediate pinions 91 to the escape mechanism mounted in a cage 98 (Fig. 6) and fastened on one of the plates 94 of the clockwork. The other plate 93 of this system bears against the casing Bo of the apparatus and the whole is fixed in position by means of struts 96 (Fig. 2) guided on pins 95 riveted on the casing Bo, the whole being tightened up by nuts 97.

A spindle 92a (Figs. 2, 6 and 7) of the clockwork drives the pinion 108 always in engagement with a pinion 113 integral with a sliding sleeve 114 integral itself with a ratchet wheel 115 and transmitting its movement by means of a pawl 117 integral with a hub 118 integral itself with the wheel 124. All these members are loosely mounted on the spindle 112 and the hub 118 is maintained in position by the ring 116 keyed on 112 and the wheel 124 is always in engagement with the wheel 64 (Fig. 36).

Removable bearing of the worm

The flexible drive 172 coming from the wheel of the vehicle is integral with a member 173 driving, by tenon and mortise, a hollow spindle 166 rotatable in a ring 167 fixed on the base Bx of the casing Bo by means of screws 167'. The spindle 166 is integral with a pin 165 of the worm 164, the upper end of which rotates in a square bearing 163 (Figs. 2 and 4ª) fixed on its base on the ring 167, a corresponding hole being provided in the base Bx of the box Bo.

The worm 164 drives the toothed wheel 161 the number of teeth of which is corresponding to the diameter of the tyre-wheel of the vehicle.

The wheel 161 is integral with the conical pinion 160, rotating about the spindle 162 fixed on the bearing 163.

Besides the taximeter can be actuated by a running wheel of any suitable diameter; to this purpose, without removing any internal number of the taximeter nor any closing members of the casing, it is sufficient to dismount the screws 167, to withdraw the ring 167 secured to the worm 164 and to the bearing 163, to unscrew the spindle 162 and to replace the worm wheel 161 or the pinion 160 by another wheel of a different number of teeth, to change as required the worm 164 and to remount these parts.

Fastening of the taximeter

The taximeter is fixed to the vehicle in such a manner to be oriented at will in the direction which allows to the client to read the most easily the indication of the dial. For this purpose (Fig. 4) the ring 167 is tightened up on the support 169, with the interposition of a soft washer 168, by means of a nut 170 on which the member 173 secured to the flexible drive 172 rotates.

Mileage movement

The conical pinion 160 engages with two bevel pinions 156 loosely mounted on a spindle 157 and actuating by means of their pawls 155, ratchet wheels 154 fixed on this spindle. According to the orientation given to the pawls 155, the spindle 157 receives a movement in the same direction whatever is the direction of rotation of the worm 164.

The movement of the spindle 157 is transmitted to the wheel 124 by means of a change-speed mechanism which provides different tariffs for the drive (three in this case). This mechanism is represented in Figs. 4 and 36 for the position of Tariff 3 and in Fig. 6 for the position of Tariff 1, and comprises the following members.

A pinion 153 (Figs. 4, 6 and 36) secured to the lower spindle 157 carries a clutch 152 which can be engaged with pinion 151 integral with a sleeve 142 carrying also a pinion 143. The latter is always engaged with a pinion 132 secured on a sleeve 133 and a ratchet wheel 131 and loosely mounted on the spindle 112. These pinions 143 and 132 are for the Tariff 2.

On the sleeve 142 are loosely mounted two independent arrangements, one comprising a ratchet wheel 145, a pinion 146 and a washer 147, all securely connected together; the other arrangement comprises a washer 148, a pinion 149 and a clutch 150 also connected together.

The pinion 149 is engaged with the pinion 128 (Tariff III) and the pinion 146 with the pinion 129 (Tariff I). These pinions 128 and 129 are integral with a hub 127 secured to a ratchet wheel 126 and to pawls 130. The ratchet wheel 126 engages with the pawls 125 integral with the wheel 124. The whole can rotate about the spindle 112. The movement of the spindle 157 is so transmitted, by means of one or another of the pinions 146—129, 149—128, 143—132, to the wheels 124 and 64 when the vehicle is running.

The wheel 124 can be actuated either by the time movement (clockwork) or by the movement of the tyre-wheel of the vehicle according as one or another of these movements is in advance of the other. The spindles 112 and 157 swing, on the one side, on the plate of the clockwork, rotate at the other end in a bearing provided with two parts 158, the one of which is riveted to the casing Bo and the upper part of which, secured by means of the screw 159 allows the both spindles to be quickly removed (Fig. 4).

The wheel 124 engages with a wheel 64 of a mechanism comprising a combination of members adapted to produce a sharp disengagement of the numeral drums 47, 46 and 45 indicating the fare to be paid for the travelling. The wheel 64 allows also the return to zero of the said drums.

Working (starting of the drums 45 to 47)

The wheel 64 is connected to a disc 57 (Figs. 11 and 36) by a spring 61 hooked to a pin 62 on the wheel 64 and to a pin 58 on the disc 57. In this manner and opposite to the usual arrangements, the two members, wheel 64 and disc 57, are never rigidly connected together. The disc 57 is there constantly urged by the spring 61 in the same direction as the wheel 64, but a pawl 52, hinged on the disc 57 is maintained by a spring 53 in engagement with the teeth of the star wheel 51 and is opposed to the motion of the disc 57 until the pawl has been raised by the pin 62 which rotates with the wheel 64 in the direction of the arrow (Fig. 11ª). The wheel 64 is driven in rotation by the wheel 124, as clearly shown on Figs. 11ª and 36. At this time, the pawl 52 escapes from the teeth of the star wheel 51, the disc 57 rotates through a fraction of revolution under the action of the spring 61 and the pawl 52 engages again with the following tooth.

A detent 56, maintained by the spring 53, tends to maintain the disc 57 in a fixed position relatively to the teeth of the star wheel 51 at the moment of the return to zero.

Time of engagement

The mechanism aforesaid described ensures also the control of the duration of the time of engagement. As it will be hereinafter seen at the time of the return to zero, the wheel 64 becomes loose, while the timing and mileage driving mechanisms are disengaged; the disc 57 being maintained by the pawls 52 and 56 on a tooth of the star 51, the spring 61 takes back the wheel 64 until a pin 63 integral with 64 pushes against the block 58 integral with 57. The duration of the time of engagement is so adjusted by the angular space provided between said pin 63 and the block 62 driving the mechanism, that, at the time of the next engagement indeed, after the return to zero, the wheel 64 must first travel over this determined angle before 62 comes and disengages the pawl 52, causing thus the first starting of the drum 47.

The quick movement of the disc 57 is transmitted to the first drum 47 (cents drums) by the pinion 41 actuated by the transfer sectors h with four teeth, fixed on the circular part of the disc 57. The cents drum 47 actuates, by means of its sector h, the dollars drum 46, which in turn actuates the drum 45 corresponding to the ten dollars.

This transmission device by means of pinions 41 with alternately long and short teeth is well known but, in this taximeter, this device is characterized by the fact that in principle, the wheel 57 and the drums 47, 46 and 45 are never moved together or simultaneously. To this purpose and in the present instance (see Figs. 11a, 36, 45, 46 and 47), the star 51 is provided with 8 teeth and the inner pinion $De$ of the drums is provided with 40 teeth, the disc 57, carrying 8 sectors $h$ provided with 4 teeth, rotates through 1/8 of revolution at each starting and transmits to the cents drum 47 a rotation corresponding to $\frac{4}{40}=\frac{1}{10}$ of a revolution. The drum 47, bearing 10 numerals and two graduations "15, 35, 55, 75, 95", carries two sectors $h$ with 4 teeth opposite each other and transmits, for each half-revolution, a rotation of $\frac{1}{10}$ of revolution to the dollars drum 46.

The latter bears also 10 numerals 0 to 9 and transmits, at each revolution by means of a sector $h$ provided with 2 teeth, a rotation of $\frac{2}{40}=\frac{1}{20}$ of revolution to the drum 45 which bears 20 numerals (0 to 19).

All the drums 45, 46 and 47 and the disc 57, having not the same angular space to travel, do not begin their rotation simultaneously, which allows the use of a smaller spring 61 than necessary if all these members would be driven simultaneously in rotation.

If the cents drum 47 would bear a double numbering, 00, 25, 50, 75 . . ., it would be only provided with 8 numerals and should be rotated through 1/8 of revolution. In this case, the star 51 might be only provided with 6 or 5 teeth and the rotary motion would decrease from the disc 57 (rotating through 1/6 or 1/5 of revolution) to the drum 45 (rotating through $\frac{1}{20}$ of revolution).

*Extras mechanism*

The mechanism for registering the extras is also controlled by the manipulation of the flag. It is arranged between the wheel 64 and the tariff drum 75 (Figs. 2, 4, 12, 16, 16a and 36).

This mechanism comprises a disc 65 loosely mounted on the hub 34' of the last left member 34 (Figs. 16a and 36), and two connecting drums, the one of which 49 is loosely mounted on the hub of a member 34, and the other 48 loosely mounted on the hub of the star wheel 51 (Fig. 36).

The drums 48, 49 and the members 34 are of the same construction than that already described for the registering of the fare.

The tariff drum 75 (Figs. 12 and 16) carries on its flat surface 75x a pin 72 engaging with a pin 71 integral with the disc 65. On the hub 75a of the drum 75, a ring 73 can rotate under the action of a spring 74 (Fig. 12) fixed, on the one hand, on the ring 73 and, on the other hand, on 75. This ring constantly tends to apply the pin 71 against the pin 72.

The disc 65 carries a pawl 66 and a curved lever 68. The pawl 66 is placed under the action of a spring 67 and can oscillate in a diametrical plane of the disc 65; the lever 68 is placed under the action of a spring 69 and can be displaced in the plane of the said disc.

When the flag is coming from the position "Payment" to the position "Extras" (Figs. 3, 16 and 16a), the inclined edge of the pawl 66 meets the short tooth of the pinion 41 carried by the sliding member 35 of the drum 49 and the pawl 66, sliding on this tooth of the pinion 41, falls behind this tooth (see Fig. 16).

In order to indicate the extras, it is necessary then to move the flag in the opposite direction between the position "Extras" and the position "Payment". This retrograde motion of the flag is transmitted to the pinion 41 by the shaft 1, the drum 75 and the pins 71, 72, the ring 73, the spring 74, the disc 65 and the pawl 66. In order that the extras should be registered impulsively and not in a continuous manner, the following members come into action.

Figure 1:
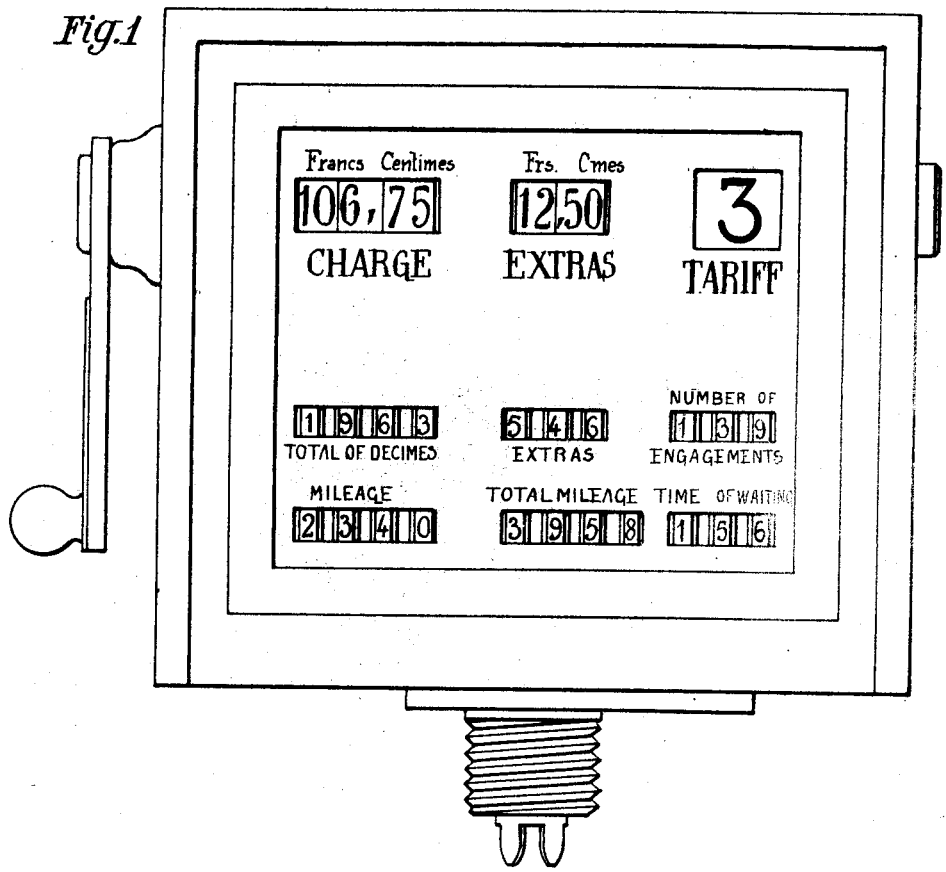
Fig. 1 is a general external view of the taximeter.

By reason of the rotation of the shaft 1 in the direction stated by the arrow $F^1$ (Figs. 10, 12, 16), the back of the pawl 66 (that is to say the part opposite to the inclined edge of the latter) engages with a short tooth of the pinion 41 and cannot rotate the latter because the following long tooth of the said pinion does not find a corresponding aperture on the internal circular and flat face 65a of a disc 65 (Fig. 9). Consequently the disc 65 remains stationary although, the tariff drum 75 receiving a backward movement in the direction indicated by the arrow $F^1$, the pin 72 leaves the pin 71 on which the ring 73 with the spring 74 acts. When the pin 72 is into contact with the raised part or projection 1 of the lever 68 (Fig. 16), the latter oscillates (Fig. 10) and in this manner leaves between its end 68a and the pawl 66 a passage 68' (Fig. 10) for the long tooth of the pinion 41. The latter (Fig. 12), under the action of the spring 74 on the ring 73 and the block 71 integral with the disc 65 which rotates, can then turn through a few teeth and registers a unit of the extras by means of a drum 49. The same movement is repeated at each registration, that is to say every time that the flag is brought from the position "Payment" to the position "Extras" and backwards. If the drum 49 carries for instance the numerals 00, then 50, then 00, the chauffeur has been obliged to work twenty five times the flag from "Payment" to "Extras" in order that the numeral 12, 50 will be visible through the wicket "Extras" (Fig. 1).

*Return to zero*

In order to efface the amount of fare and extras registered by the drums 45 to 49, the arrangement for returning to zero is actuated always by means of the flag driven to a vertical position.

Figs. 17, 18 and 19 are sections on the line X of Figs. 20 and 36 looking in the direction stated by the arrows.

Figs. 21 and 22 are sections on line X of Figs. 20 and 36, looking the disc 27 by the face opposite to this shown on Figs. 17 to 19.

In the operating positions of the different mechanisms, that is in those corresponding to the position of the flag denoted by Tariff 1, 2 or 3, payment or extras (Fig. 17), the lever 19, pressed by a spring as shown by a little arrow drawn on this lever 19, is fully engaged in the recess $e$ of the disc 27 and stops the projection $25^a$ of the sleeve 25 which thus remains stationary (Figs. 21 and 22). The projections 37 of the sliding members 35 are removed at this time (working position) from the groove $r$ of the sleeve 25 and are applied against the periphery of the latter (Figs. 22 and 24); the pinions 41 are engaged with the teeth $De$ of the drums 45—49. When the flag, starting from the position "Extras" has reached a position at 45° relatively to the vertical plane, the pawl 12 (Figs. 18 and $20^a$) enters the first tooth of the toothed part $11a$ of the ratchet wheel 11. In the same time, the pin 31 enters the outer groove of the cam 13 and the screen 32 closes the windows through which appear the fare and the extras to be paid. The flag moving towards the vertical line the cam 14 integral with 13 acts on and moves out of the groove $e$ the end 20 of the lever 19 and thus allows the sleeve 25—$25^a$ to rotate only in accordance to the length of the aperture $26^a$ of 27 and to take the position shown in dotted lines in Fig. 17 under the action of springs 29 and 23, that is to say a position in which the projections 37 of the sliding members 35 fall into the groove $r$ of the sleeve 25 (Figs. 21 and 23). The pinions 41 are thus out of engagement from the drums 45 to 49, which are then loose relatively to each other and are held in their position by means of the member 33 integral with the lever 30 carrying the pin 31 and the screen 32. The number of brakes 33 is equal to that of the drums. It will be noted that each brake may either rub on its drum, or do not touch the latter, but be on the travel of a pin 50 (Figs. 23 and 24) integral with the drum.

As the movement of the flag continues, the small cam 14 releases entirely the part 20 of the lever 19 from the groove $e$ of the disc 27 which is thus released. The latter, driving on the members 34 and 35 rotates under the action of the spring 23, which rotation is stopped by the contact between the member $25a$ and the pin 17 integral with 13. The members are in the position shown in Fig. 18.

In order to have a complete revolution of the disc 27, the flag should be always driven in the same direction, i. e. that the flag, starting from the vertical position (Fig. 18), is driven to the position shown in Fig. 19. At this time, the part 20 of the lever 19 enters again the groove $e$ of 27. The movement of the flag is stopped by the pin 18 integral with 13 which comes into contact with the said part 20.

During the rotation of the members 24, 25, $25a$, 27, 1, 2, 6, 9, 10, 11, 13, 35 and 36, a pin 44 of each drum 45 to 49 is met by a pawl 39 of each sliding member 35. This pawl, after being raised, falls behind the pin 44 which is now imprisoned, between 39 and the projection 38 of the member 35 (Fig. 23). From this time forth, each drum follows the rotation of its sliding member 35 and is driven to a position corresponding to the indication of the fare of the engagement. This indication corresponds in the applicant's taximeter to the effective position of the return to zero.

But the screen 32 hides always the windows behind which appears the said indication of the intial fare of engagement (Fig. 19).

It is to be noted that, contrary to the action in known apparatus in which the numeral drums are stopped at the end of the return to zero by a bolt acting on a pin, the pin 50 only acts in this case in order to prevent the said drums from following, by friction on the hubs 34', the movement of the return to zero until the extension 38 meets the block 44; at this moment, each drum is actuated and the pin 50 escapes from the spring 33.

In order that the flag may be then pressed down to the position "Tariff 1", it is necessary to raise it again to the position "For hire". This backwards movement is possible owing to the position of the pawl 12 on the flat part (from $a$ to $b$, Fig. $20^a$) of the ratchet wheel 11, which part is comprised between the two toothed sectors $11a$ and $11b$.

During this movement, the sleeve 25, $25^a$ is rotated backwards by the block 17 pressing on the spring 29 (Fig. 22). This movement being completely effected, the projection $25a$ is removed and the lever 19, 20 falls into the bottom of the groove $e$ of the disc, which is thus held fixed together with the star 51 and the sliding members 35. At the same time, the sleeve 25 (Fig. 22) having rotated relatively to the members 35 (Fig. 24), the tongue 37 of the latter is raised by the inclined surface of the groove $r$ of the sleeve 25 and the engagement of the pinions 41 with the teeth $De$ of the drums takes place. The parts are then in condition to allow the flag to be placed at the various tariff positions, the part 20 of the lever 19 being not located on the travel of the pin 18 (Fig. 19).

Integrating devices

The different integrating devices are mounted in a frame comprising two horizontal brackets 190, 191 fixed on struts 192 carrying the spindle 188 of the small drums such as 186 and the spindles 189 of the pinions as 189' (Fig. 12). The whole may be easily removed by unscrewing only the screws v. The numeral device for the total miles (Figs. 6 and 11) is driven by the pinion 153 on the spindle 157 engaging by means of a train of pinions 175 with a clutch wheel 178 (Fig. 6), which, at each revolution, moves a pinion 179 through the space of two teeth, transmitting by a spindle 180 and a pinion 181 the movement to the front disc 182 of the numeral device, thus registering the total miles wandered over by the vehicle, the wheel 153 being indeed keyed on the spindle 157 (Fig. 36).

The numeral device for the engaged miles (Fig. 6) is driven by the pinion 151 when the latter is in engagement with the clutch 152 of the pinion 153. The transmission is effected by a train of pinions 176, mounted loosely on a spindle 177 which train gearing with the first disc 183 indicating the hectometers.

The device for registering the time "Not recording" or "Payment" is actuated in the following manner (Figs. 12, 6 and 7). Pinions 109 and 110, connected together by a pin g are loosely mounted on the hub of a pinion 108. The pinion 109, the teeth of which are rounded on their flange or end, is of the same diameter as pinion 108, and pinion 110 gears with a pinion 111 which is in engagement with the first disc 187 of the device for registering the time of payment, when 113 is engaged with 109 by lateral displacement of 113.

The device for registering the total fare acts as follows (Figs. 13, 14 and 15); the disc 57 carries blocks or side projections 59, each followed by a recess m, and engages with a pinion with four teeth 197 connected by a pin 199 integral with the four teeth pinion 196 by means of a spring 198. The pin 199 engages in a recess of the pinion 197 and when the both pinions are unwedged relatively one to another through 45 degrees, they form in plan a pinion with eight teeth.

At each disengagement or rotation of the disc 57, one of the blocks 59, meeting a tooth of the pinion 197, drives the latter, that permitting the following tooth of the pinion 196 to engage with the recess m. The motion of the disc 57 continuing, the following tooth of the pnion 196 runs against the flat periphery of the disc 57 and the motion of the pinions 196—197 is stopped, the members 196—197 being rotated through two teeth, that is a fourth of revolution. The pinion 196 drives, by means of a pinion p, the first disc 184 of the integrating device of the number of disengagements (Fig. 2).

Said device avoids any smuggling, the teeth of the pinion 196, rubbing on the disc 57, oppose indeed any motion of rotation of the members 196—197 and consequently, of the pinion p.

At the time of the return to zero, the disc 57, driven by the pawl 52 in contact with a tooth of the star 51, rotates through a backward revolution. This motion would be impossible if one of the teeth (197a for instance) of the pinion 197 met by the block 59 would not disengage before it by compression of the spring 198 and would not be in line with the tooth 196ᵃ of the pinion 196. As soon as the block 59 is passed away, the tooth 197ᵃ takes again its position under the action of the spring 198 in order to be again thrown back, as aforesaid described, by the succeeding block 59 (Fig. 14).

A lamellar spring 200, fixed in 200' on the cross-bar 191 (Figs. 2 and 12), acts on a square part c (Figs. 13 and 15) integral with the pinions 196 and p and prevents the teeth of the pinion 196 from being accidentally introduced in the recesses m of the disc 57.

This device permits, on the one hand, the driving of the integrating device in a direction and, on the other hand, the backwards return of the disc 57 without driving in the contrary direction the integrating device which remains held.

The device for actuating the "Extras" is controlled by a mechanism similar to the mechanism described for registering the fare. A dog or side projection 70 (Fig. 16) and a corresponding recess m of the disc 65 act on a train of pinions similar to that of pinions 196—197 described above, the pinion p of this train 196—197 actuating the small first drum 185 (Fig. 2).

The registering device of the number of engagements (trips) is actuated (Fig. 2) by a dog 78 (with a corresponding recess m) fixed on the tariff drum 75 which controls a train similar to that of train 196—197. However, as the movement is only effected at the moment at which the flag 2 is displaced between the position "Extras" and the position "Vacant" and can only rotate in one direction (the lever 12 engaging with the teeth 11ᵃ of the ratchet 11), the elastic connections between the two pinions 196, 197 can be cancelled. The pinions p of this train 196—197 meshes with the first drum 186 of the integrating device of the number of engagements or trips.

General working

Assuming that the client has left the car, the flag is raised up at its vertical position and the screen 32 is dropped. The disc 27 and the cylindrical whole comprising the drums 45 to 49 and the sliding members 35 are disengaged, see Figs. 18 and 23. The pin 63 of the wheel 64 is in contact with the pin 58 of the disc 57. The cam 76 of the tariff drum 75 bearing against the pin 103 of the lever 101 pushes the spring 104 against the member 100 (Figs. 4, 12 and 36). The lever 105, drawn by the spring 105' towards the bottom of the cam 77 disengages, by means of the pin 107 (Fig. 4), the ratchet wheel 115 from the flexible pawl 117. The levers 137 and 135, being on the cams 9 and 10 in the position corresponding to "Vacant" (Figs. 4, 8 and 37), the lever 137 draws, by means of the crank shaft 138 and towards the side of the casing, the lever 139 pivotally mounted at 140 on a member secured to the casing Bo. The pin 141 drives the sleeve 142 (Fig. 36) and disengages the pinion 151 from the pin 152 of the pinion 153, the pinion 151, having also disengaged the ratchet wheel 126 from the pawl 125 integral with the wheel 124 by the pressure on the sliding whole 150, 149, 148, 147, 128, 127, 129. At this position, the clockwork mechanism is stopped and, if the car is running, the total mileage integrating device, driven by the pinions 153, 175, is alone registering.

In order to put the taximeter at "Tariff 1", the flag should be first lowered through 30° and then taken back to "Vacant", in order to end the return to zero and to engage the pinions 41 with the teeth De of the drums 45 to 49. The flag should finally be taken forwards to position "Tariff 1".

During this movement, the cam 13, actuating the pin 31 of the lever 30, raises the screen which shows thus the windows "Fare to be paid" and "Extras" (Fig. 17). But before the end of this movement, the mileages and time registering devices have worked as follows: The lever 137, hinged on the shaft 136 and driven by the spring 142, slides along the inclined plan of the cams 9 and 10 and comes into contact with the cam 11.

Tariff 1

The pin 141 has moved the sleeve 142 and pushed the pinion 151 against the members 152 which enter the teeth of 151. The pawl 144 bearing on the ratchet wheel 145, pushes, by means of the members 147—149, the sleeve 127 against the pin 116 of the shaft 112 and engages simultaneously the ratchet wheel 126 with the pawl 125 of the wheel 124. If the car is running, the motion is transmitted from the flexible 172 to the wheel 124 through the pinion 146 in engagement with the pinion 129 (Tariff 1). The mileage integrating device for the time of engagement is then actuated together with the total mileage integrating device by the pinion 151 integral with 153. Simultaneously the inclined edge of the cam 77 of 75, pushing the lever 105 towards the centre of the apparatus, causes the ratchet wheel 115, through the finger 107, to be engaged with the pawl 116 of 117, 118, 124. The clockwork mechanism is thus allowed to actuate, by means of 92ª, 108, 113, the wheel 124, because the cam 76 of 75 has caused the lever 101 to fall, the spring 104 of which lever is drawn away from the member 100 of the clockwork mechanism.

Consequently according to the running or the stopping of the car, the pinion 124 drives the wheel 64 on the shaft 1, which wheel is moved through the angular space corresponding to the time of engagement either for the distance of the course or for the duration of the time of engagement. The pin 62 of the wheel 64 releases the pawl 52 (Fig. 11) causing the first rotation of the first fare drum 47.

Tariff 2

When the flag is at "Tariff 2", the cam 9 does not hold the lever 135 which is pushed towards the centre of the apparatus by means of its spring 135ª. Through the pin 134, the lever 135 drives on the sleeve 133 the ratchet wheel 131 of which comes in contact with the pawl 130 of 127, 129. The displacement of the tyre-wheel of the car is transmitted to the pinions 143 and 132. The diameter of the pinion 143 being greater than that of the pinion 146 and consequently the rotation of the pawl 144 being greater than that of the ratchet wheel 145, this pawl springs on the teeth of 145 (Fig. 36).

Tariff 3

The flag being at this position, the cam 10 allows the lever 137 to be moved towards the outside (Fig. 5) driving the sleeve 142—151 through 138, 139, 141 (position shown in Fig. 4). Owing to the member 152, the pinion 153 remains in engagement with the pinion 151. But the sleeve 127 remaining always pushed towards 124 by the sleeve 133 of the Tariff 3, has not been moved and has held in their position the members 150, 149, 148 and 147, 146, 145. A quicker transmission of the rotation to the wheel 124 is ensured by means of the pinions 149—128. The pawl 130 slides on the teeth of the ratchet wheel 131. The pawl 144 (Tariff 1) is completely disengaged from the wheel 145.

Owing to the above arrangement, during the working at Tariff 2, the Tariffs 1 and 2 are simultaneously in engagement and during the working at Tariff 3, the Tariffs 2 and 3 are simultaneously in engagement. Neither intermediate position takes place during which neither tariff is in engagement.

*Payment or time not recording.*—After the end of the course of the car, the flag is driven to the position "Payment". The cam 77 of the drum 75 is drawn away from the lever 105 which disengages the ratchet wheel 115 from the pawl 116, thus avoiding the numeral drums to be actuated by the clockwork mechanism. During its displacement, the pinion 113 is engaged with the pinion 109 (Fig. 7) and transmits, through the pinions 110 and 111, the displacement of the pendulum to the disc 187 of the integrating device for the time corresponding to the period "Payment".

*Extras.*—For registering the extras, the flag is alternatively moved between the positions "Extras" and "Payment". After each rotation there and back of the flag, the "Extras" drum 49 rotates through one division and the "Extras" integrating device is actuated by the pin 70 (Fig. 16) for registering one unit of the extras.

At the positions "Payment" and "Extras", the mileage registering device remains engaged with Tariff 3, but the time registering device is disengaged from the wheel 124, whilst the "Payment" registering device is actuated by the pendulum through $92^a$, 108, 113, 109, 110 and 111.

*Return to zero.*—In order to strike out the fare registered by the drums 45 to 49 and before taking up a new client, the flag is driven to "Vacant": the pawl 12 enters the first tooth of the sector $11^a$ of the ratchet wheel 11, the pin 31 of the lever 30 enters the groove of the cam 13 and the screen 32 hides the indications of the drums 45 to 49. The cam 10 releases the lever 137 which in turn releases the pinion 151 from the pins 152 and simultaneously the ratchet wheel 126 from the pawl 125 of the wheel 124. The latter, being loose on the shaft 112, allows the wheel 64 to be drawn back by the spring 61 until the pin 63 comes into contact with the pin 58 (Fig. $11^a$); the cam 76 of 75 actuating the member 101 stops the clockwork mechanism. The small cam 14 releases the lever 19—20 from the projection $25^a$—25 and allows the position of return to zero to be taken by the sliding members 35 (Fig. 23). The lever 19—20 is then completely disengaged from the disc 27, ensuring the rotation of the cylindrical whole mounted on the shaft 1 under the action of the spring 23, all the members of which whole return to zero.

Modifications

*Return to zero.*—The arrangement shown in Figs. 25—28 is provided to reduce the angular path of the flag 2 during the manipulation for the return to zero.

This device differs from this above described (Figs. 18—20) by the fact that the return to zero is entirely finished when the flag is at the position "For hire" and that the radial movement of the sliding members 35 in the drums 45 to 49 is obtained by a backward movement through about 30° from the position Free (Fig. 34). The members 24 and 25 are integral with each other, by means of a projection $24^a$ of 24 entering a groove $25^b$ of $25^a$ (Fig. 38). The small cam 14 (Figs. 18 to 20) is replaced by the member 14' pivotally mounted on the plate cam 13. The member 14' is drawn by a spring $14^a$ towards the center of the cam 13 (Figs. 25 to 28). At the time of the return to zero, the tubular or cylindrical whole of the drums 45—49 is maintained stationary by the lever 19, the projection 19' of which is engaged in the bottom of the groove $e$ of 27, the pinions 41 with the teeth $D^e$ of the drums 45 to 49 being in engagement. During the rotation of the flag driving the cam 13 and the member 14', a pin 16 of the latter is rubbing on the part B of 24; then a projection 15 of 14', engaged under the pin $20^x$ of the lever 19, raises the latter and releases a little the said lever from the groove $e$ of 27.

As soon as this rising of the lever 19 is sufficient to allow the passage of the member $25^a$, the latter is driven forward with 24 (Fig. 25). This movement determining the radial movement of the sliding members 35 and causing the drums 45—49 to be at the position of the return to zero (Figs. 21, 23 and 27) which is effected when the lever 19 leaves completely the disc 27. The whole of the drums effects, as above described (Figs. 17 to 23), a complete rotation which is limited by the pin 16 of 14' which is brought nearer the shaft 1 and enters the groove $d$ of 24 (Fig. 26). The flag cannot pursue its forward displacement (arrow $F^2$, Fig. 26) because the projection 18 is riveted on 13 is stopped against the pin 20 of 19. Then, by reason of the backward movement of the flag (arrow $F^3$, Fig. 27), the member 14' drives the members 24 and 25, the sliding members 35 slide in the drums 45—49 (Fig. 24), the lever 19—19' enters the bottom of the groove $e$ of 27 and the pin $20^x$ being not on the path of the projection 18, the flag by a forward rotation (arrow $F^2$) may be drawn to any tariff position whatever.

Mounting of the sliding members

Instead of being jointed by tenon and mortise, as previously described, the members 27, 34 and the star 51 can be connected together by means of keys 79 (Fig. 29) or rods $79^a$ screwed in the disc 27 and in the stopping nut 81 or by means of a sleeve 79' with longitudinal tenons $80^a$ (Fig. 30), this sleeve 79' surrounding the sleeve 25 provided with the groove $r$. The tenons $80^a$ maintain at once the members 27, 34 and 51 whilst permitting the play of the sleeve 25. The method of mounting is not of particular importance, the essential feature being that the members 27, 34 and 51 form a rigid whole concentric to the sleeve 25 and to the shaft 1.

Engagement of the disc 57

The arrangement represented in Fig. 31 is intended to increase the accuracy of the disengagement of the disc 57 after the end of time of engagement; this disengagement differs from that above described by the fact that the pin 63 of the wheel 64, instead of disengaging slowly the pawl 52 from the teeth of the star wheel 51, acts on the arm 54 which compresses the spring 55, the pawl 52 being able to be lifted up quickly under the influence of the spring 55 only when the sector 53 secured to the pinion 64 will not bear on the pin 52ª of 52 (Fig. 31).

*Fastening of the star 51*

In the arrangement shown in Fig. 32, the star wheel 51 is not secured to the tubular arrangement formed by the members 27 and 34. This star wheel 51 is mounted loosely on the hub of one of the members 34. The star wheel 51 carries an arm 201 fixed at some point of the apparatus (on the spindle 21, for example), and consequently the members 51 and 57 do not turn backwards at the moment of the return to zero; the members 27, 34 and 35 rotate and return to zero with the drums 45 to 49.

*Lost time mechanism*

The duration of the time of engagement can be increased by mounting on the spindle 112, between the pawls 117 and 125 and on the pinion 124, an arrangement for lost time comprising a return spring 122 (Fig. 35) applying a pin 123 (secured to the pinion 124) to a pin 121 which, by means of the hub 118, is made rigid with the pawls 117 and 125. A second pin 120', fastened on a circular extension of the hub 118 controls the amplitude of the movement. The pin 120' may, in order to increase more or less the duration of the time of engagement, be screwed or riveted on the hub 118 at a distance more or less important from the pin 121. Before 120' comes in contact with 123 and bears on the latter, the wheel 124 cannot turn because the spring 61 (Fig. 11 or 11a) which acts on 124 by means of the wheel 64 is stronger than the spring 122 the function of which is only to remove back the wheel 124 to the initial position at the time of the disengagement of the return to zero.

The same arrangement or combination applied respectively between the pinions 149, 146, 143, 132 and 113 (Figs. 4, 6, 36) and the ratchet wheel (such as 145) or dogs such as 150 to which these pinions are connected, provides a mechanism for the time engagement which is different for each tariff and for the time charge.

The mechanism for lost time represented in Fig. 33 has the effect of increasing in larger proportion than that shown in Fig. 35, the period of the time of engagement.

In the position "Vacant", the spring 122, secured at one end at 124ᵇ to the wheel 124 and at the other end on 121 to the nut 120, unscrews the latter and applies it against the plate 118ª of the hub 118 rigid with 117 and 125; the hub 118 is mounted on the spindle 112. The mechanism of the taximeter being engaged at one of the tariff positions, the wheel 124 remains stationary because the spring 61 (Figs. 11—11ª) is stronger than the spring 122 (Fig. 33) but the hub 118 rotates with the pawls 117 and 125. The hub 118 takes with it, by means of the pin 119, the nut 120, which is thus screwed by one or more turns on part 124ª of the pinion 124 until the pin 121 meets the pin 123 and draws with it the pinion 124. The adjustment of duration of the time can be effected by varying the respective lengths of the pin 121 and 124 and their relative angular positions.

What I claim is:

1. In a taximeter, a controlling shaft, fare drums, extra drums and a tariff drum supported by said shaft, said drums being of uniform diameter, a clock spring and barrel mounted concentrically with said shaft and means for tensioning the spring by movement of the shaft.

2. In a taximeter, a control shaft, means for stating the fare to be paid, the extras and the tariffs, a clockwork spring, a barrel, said means, spring and barrel being mounted coaxially with said shaft, means for tensioning the spring, the shaft being removable longitudinally.

3. In a taximeter, a casing, a support detachably secured to the exterior of the casing, a worm rotatably carried by the support and projecting into the casing, a worm wheel also rotatably carried by the support and arranged in the casing, and means for driving the worm by movement of the vehicle and for transmitting motion from the worm wheel to the registering elements of the taximeter.

4. In a multi-tariff taximeter, speed change mechanism comprising two parallel shafts on each of which is rotatably mounted a sliding set of pinions, the pinions of one of the sliding sets being independently rotatable with respect to each other but always in engagement with the pinions of the other sliding set, each set of pinions being provided with ratchets and said mechanism also comprising pinions carrying pawls adapted to engage respectively said ratchets.

5. In a taximeter, a controlling shaft, a tube, a series of sleeves rotatably mounted on said tube, numeral drums rotatable on said sleeves, sliding members (35) mounted upon said sleeves, said parts being clamped relatively to the tube by means of a nut (80) screwed on said tube.

6. In a taximeter, in combination, a controlling shaft, a tube and a series of sleeves rotatably mounted thereon, numeral drums rotatably carried by said sleeves, sliding members mounted on said sleeves, transfer pinions mounted on the sliding members and adapted to move into and out of engagement with the drums, means for controlling said movements by the tube, devices for connecting each drum to its supporting sleeve in zero setting, means for turning the tube to release the pinions and for thereafter turning the sleeves to set the drums to zero.

7. In a taximeter, a controlling shaft, a tube and a series of sleeves mounted upon the tube, numeral drums having gear teeth carried by the sleeves, members slidably mounted on the sleeves, said sliding members carrying each a transfer pinion meshing with the teeth of one of the above drums and with the teeth of the preceding drum.

8. In a taximeter, a controlling shaft, a tube and a series of sleeves mounted on said tube, numeral drums carried by the sleeves, members slidably mounted on the sleeves, transfer pinions carried by the sliding members, said tube being longtudinally grooved, a side of said groove being inclined and said sliding members having a beveled spring pressed member engaging in said groove.

9. In a taximeter, a controlling shaft, a grooved tube and a series of sleeves mounted on the tube, numeral drums carried by the sleeves, members slidably mounted on the sleeves, transfer pinions carried by the sliding members, said sliding members being each provided with a nose (38) and a spring pawl adapted to engage a pin secured to the inside of the corresponding numeral drum to drive said drums during the return to zero.

10. In a taximeter, a controlling shaft, a grooved tube and a series of sleeves mounted on the tube, numeral drums carried by the sleeves, members slidably mounted on the sleeves, transfer pinions carried by said sliding members, means for turning the tube to release the pinions and thereafter for turning the sleeves to set the drums to zero, said means comprising a zeroizing disc integral with the sleeves, a spring lever engaging said disc, a member for disengaging the lever from the disc, abutments to limit temporarily the movement of the flag, a disengaging spring connecting the disc with a radial projection of the grooved tube and a zeroizing spring connecting the shaft of the flag to the sleeves.

11. In a taximeter, a first fare drum, and a driving mechanism therefor comprising in combination, a star wheel, a driving toothed wheel, a controlling disc, a spring connecting said toothed wheel and disc, and a pawl and a counterpawl carried by said disc and engaging the star wheel.

12. In a taximeter, a first fare drum, a driving mechanism therefor comprising, in combination, a star wheel, a driving toothed wheel, a controlling disc, a spring connecting said toothed wheel with said disc, a pawl and a counterpawl carried by said disc and engaging said star wheel, two pins carried by said toothed wheel, means for determining the instantaneous release of said drum comprising a spring lever (54—55) carried by said disc and mounted between said pin (62) and said pawl, and a sector (53) rigid with said toothed wheel controlling said pawl.

13. In a taximeter, an "extras" registering mechanism comprising one or more numeral drums, a disc for controlling said drums and provided with a projection engaged between an abutment movable from the shaft of the flag and an end of a spring ring, said disc carrying a pawl having a beveled tooth for actuating a pinion (41) of the first "extras" drum, said disc carrying also a spring lever for releasing said pinion when the flag shaft is rotated.

14. In a taximeter, a frame carrying the whole of the totalizing mechanisms integrating the "cents", the time of engagement, the extras, the time not recording, the mileage and the total mileage, said frame being removably secured on projections of the casing of the taximeter for permitting the removal of said frame, with the whole of the totalizers, without disturbing any inner part of the taximeter.

15. In a taximeter comprising a tariff drum, a "time not recording" or time of payment totalizer and a clockwork, a first pinion fixed to the driving shaft of the clockwork, two twin pinions independent in rotation of the first pinion, a sliding pinion (113) meshing with the first pinion and adapted to mesh with one of the twin pinions, a spring lever actuating said sliding pinion, a cam fixed with respect to the tariff drum and a pinion meshing with one of the twin pinions and with the said totalizer.

16. In a taximeter, a clockwork, a shaft, a change speed mechanism on said shaft, a member slidable on said shaft, a gear integral with said member, a flag shaft, means for controlling said member by said flag shaft, a driving pinion in the clockwork meshing with said gear, numeral drums, and means for driving said drums either through said change speed mechanism or through said slidable member.

17. In a taximeter, in combination, change speed mechanism including two slidable sets of pinions continuously in mesh and ratchet and pawl mechanism respectively associated with said sets for selectively effecting driving engagements thereof, a flag shaft, and cam and lever mechanism for controlling said sets from said flag shaft.

18. In a taximeter, a controlling shaft, a tube on said shaft and rotatable with respect thereto, numeral drums, discs for controlling said drums, a toothed wheel, a disk for controlling the return to zero, all mounted coaxially on said tube, means for rotating said tube relatively to said shaft and means controlled by rotation of said tube for returning all said numeral drums to zero.

19. In a taximeter, a controlling shaft, a tube carried by said shaft, a set of tubular sleeves carried by the tube, members rotatably and coaxially carried by said sleeves, means for fixing said sleeves with respect to each other and means for controlling through the controlling shaft the position of the tube with respect to the tubular sleeves.

20. In a taximeter, a controlling disc, fare numeral drums, toothed sectors $h$, a spring 61, transfer pinions 41 each meshing with one of the drums and with one of the toothed sectors carried by the preceding drum or disc, said spring controlling the rotation of the said numeral drums and means for avoiding for the said spring any excessive resistance which the simultaneous starting of all the said drums would effect said means being characterized by the fact that the toothed sectors of each preceding drum or disc are provided with a different number of teeth.

21. In a taximeter, the combination with a control mechanism for the numeral drums and with a speed change mechanism comprising ratchet wheels, of a device for increasing the duration of the time of the initial fare, said device comprising a spring 122 connecting a driving member 118 with a driven member 124, two driving abutments 121—123, a sleeve screwed on the driven member, the said abutments being secured to the sleeve and the driven member respectively, and two pawls 117—125 in engagement with ratchet wheels of the speed change mechanism, the driven member being in engagement with the control mechanism for the numeral drums.

22. In a taximeter, a first fare drum, a star wheel, a toothed wheel, a disc, a spring between said toothed wheel and said disc, a pawl, a counter pawl, and means for determining the intermittent releasing of the disc, said means comprising a pin (62) secured on said toothed wheel for actuating intermittently the pawl and allowing the spring to actuate intermittently the disc and a pin (63) secured on said toothed wheel for limiting the backward return thereof.

23. In a taximeter, a revolving member, a totalizer, and means for actuating said totalizer from said revolving member, said means comprising two eclipse pinions (196, 197), a spring connecting said pinions, a pinion $p$ integral with one of said pinions and meshing with the totalizer, the revolving member being provided with teeth for actuating one of said pinions and with grooves for allowing the rotation of the other of said pinions.

In testimony whereof I affix my signature.

JEAN ALBERT FRANÇOIS BRUN.